United States Patent
Chiao

(10) Patent No.: US 6,487,433 B2
(45) Date of Patent: *Nov. 26, 2002

(54) METHOD AND APPARATUS USING GOLAY-CODED EXCITATION FOR ECHOCARDIOLOGY

(75) Inventor: Richard Yung Chiao, Menomonee Falls, WI (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/756,603

(22) Filed: Jan. 8, 2001

(65) Prior Publication Data

US 2002/0091317 A1 Jul. 11, 2002

(51) Int. Cl.⁷ .............................. A61B 5/00; A61B 8/00
(52) U.S. Cl. ....................................... 600/407; 600/437
(58) Field of Search ................................. 600/407, 437, 600/440, 443–447, 458; 128/916; 3677/7, 138; 73/602

(56) References Cited

U.S. PATENT DOCUMENTS

| 5,964,706 A | * | 10/1999 | Mo et al. ..................... 600/443 |
| 5,980,459 A | * | 11/1999 | Chiao et al. ................ 600/447 |
| 5,984,869 A |   | 11/1999 | Chiao et al. |
| 6,095,977 A | * | 8/2000 | Hall et al. .................... 600/443 |
| 6,113,545 A | * | 9/2000 | Chiao et al. ................ 600/447 |
| 6,155,980 A | * | 12/2000 | Chiao et al. ................ 600/447 |
| 6,186,949 B1 | * | 2/2001 | Hatfield et al. ............. 600/443 |
| 6,210,332 B1 | * | 4/2001 | Chiao et al. ................ 600/443 |
| 6,213,947 B1 | * | 4/2001 | Phillips ...................... 600/443 |
| 6,312,384 B1 | * | 11/2001 | Chiao .......................... 600/443 |

* cited by examiner

Primary Examiner—Francis J. Jaworski
(74) Attorney, Agent, or Firm—Jean K. Testa; Jill M. Breedlove

(57) ABSTRACT

For ultrasound imaging using Golay-coded excitation for echocardiology, at least three focused and coded beams are transmitted at a fundamental frequency to each transmit focal zone during acquisition of acoustic data for a single image frame. The resulting receive vectors then undergo receive correlation and "slow-time" filtering, i.e., filtering from firing to firing. The "slow-time" filtering is accomplished by multiplying each set of receive correlation filter coefficients by respective scalar weightings before summing the resulting set of filtered receive vectors for subsequent processing to form one image scan line. Employment of more than two firings suppresses the sidelobe response without altering the mainlobe response substantially in the presence of tissue motion after the weighted receive vectors have been summed.

27 Claims, 4 Drawing Sheets

METHOD AND APPARATUS USING GOLAY-CODED EXCITATION FOR ECHOCARDIOLOGY

FIELD OF THE INVENTION

This invention relates to ultrasound imaging systems and, more particularly, to methods for ultrasound imaging using coded excitation.

BACKGROUND OF THE INVENTION

Conventional ultrasound imaging systems comprise an array of ultrasonic transducer elements which transmit an ultrasound beam and receive the reflected beam from the object being studied. Such operation comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. For a steered array, by changing the time delays and amplitudes of the applied voltages, the beam with its focal point can be moved in a plane to scan the object. For a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or time delays, to produce peak sensitivity along the desired scan lines at ranges proportional to the elapsed time. The resulting focused sensitivity pattern is referred to as a receive beam. Resolution of a scan line is a result of the directivity of the associated transmit and receive beam pair.

The output signals of the beamformer channels are coherently summed to form a respective pixel intensity value for each sample volume in the object region or volume of interest. These pixel intensity values are log-compressed, scan-converted and then displayed as an image of the anatomy being scanned.

Coded excitation is the transmission of long encoded pulse sequences and decoding of the received signals in order to improve image SNR (signal-to-noise ratio) and/or resolution. The energy contained in a long transmit pulse sequence is compressed into a short time interval on receive by virtue of the code. Coded excitation is a well-known technique in medical ultrasound imaging. For example, the use of Golay codes is disclosed in U.S. Pat. No. 5,984,869, issued Nov. 16, 1999 and assigned to the instant assignee. Because Golay codes use a pair of transmits for each transmit focal zone, only minimal tissue motion between the two transmits can be tolerated to avoid decoding errors and sidelobes (or rangelobes). As such, the two-transmit version of Golay-coded excitation may be unsuitable for imaging applications where fast tissue motion is present, such as imaging the heart.

Thus there is a need for a method of ultrasound imaging using Golay-coded excitation which increases the motion robustness of the system.

SUMMARY OF THE INVENTION

More than two focused and coded beams are transmitted at a fundamental frequency to each transmit focal zone or position during the acquisition of acoustic data for a single image frame. The resulting receive vectors then undergo receive correlation and "slow-time" filtering, i.e., filtering from firing to firing. The "slow-time" filtering is accomplished by multiplying each set of receive correlation filter coefficients by respective scalar weightings before summing the resulting set of filtered receive vectors for subsequent processing to form one image scan line. The employment of more than two firings serves to suppress the sidelobe response without altering the mainlobe response substantially in the presence of tissue motion after the weighted receive vectors have been summed.

Since frame rate is inversely proportional to the number of firings per focal zone, it is desirable to have as few firings as possible per focal zone, so the preferred embodiment has three firings: the first and third firings being pulse sequences encoded with the Golay code A and the second firing being a pulse sequence encoded with the Golay code B of a Golay code pair {A, B}. The echoes from the three firings are summed together after receive correlation, with the first and third echoes being weighted less than the second echo. Preferably the receive correlation filter coefficients are designed to pass a desired band of frequencies.

In accordance with a preferred embodiment, a [0.5, 1.0, 0.5] weighting is used on receive for summing the three echoes. The resulting effective wall filter for the mainlobe is [0.5, 1.0, 0.5], while that for the sidelobes is [−0.5, 1.0, −0.5]. The sidelobe response is suppressed by 5–20 dB below that for two-transmit Golay-coded excitation, while the mainlobe is reduced by less than 3 dB. Although substantial sidelobes still result at the higher tissue speeds, these are expected to be tolerable due the inherent visual blurring from very fast motion.

DETAILED DESCRIPTION OF THE PREFERRED EMBODIMENTS

Figure 1:
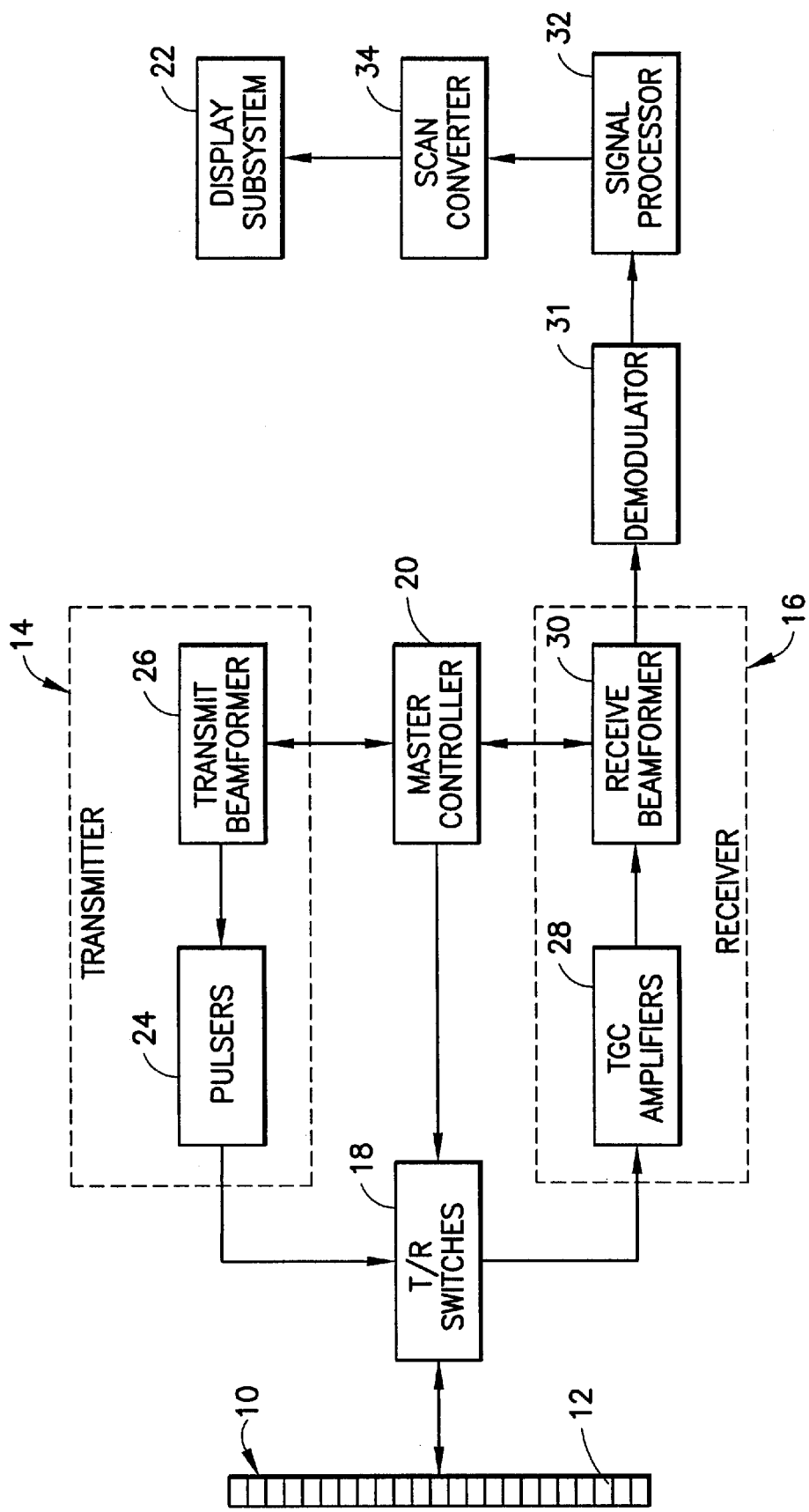
FIG. 1 is a block diagram showing the major functional subsystems within a conventional real-time ultrasound imaging system.

One ultrasonic imaging system in which the present invention can be incorporated is depicted in FIG. 1. The system comprises a transducer array 10 having a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. The T/R switches 18 are typically diodes which protect the receive electronics from the high voltages generated by the transmit electronics. The transmit signal causes the diodes to shut off or limit the signal to the receiver. Transmitter 14 and receiver 16 are operated under control of a master controller (e.g., a host computer) 20 responsive to commands provided by a human operator via an operator interface (not shown). A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal that is used to produce a line in an image on a display subsystem 22, which typically comprises a video processor with gray mapping and a video monitor.

Under the direction of master controller 20, transmitter 14 drives transducer array 10 such that the ultrasonic energy is transmitted as a directed focused beam. To accomplish this, respective time delays are imparted to a multiplicity of pulsers 24 by a transmit beamformer 26. Master controller 20 determines the conditions under which the acoustic pulses will be transmitted. With this information, transmit beamformer 26 determines the timing and amplitudes of each of the transmit pulses to be generated by pulsers 24. The amplitudes of each transmit pulse are generated by an apodization generation circuit (not shown). Pulsers 24 in turn send the transmit pulses to each of elements 12 of transducer array 10 via T/R switches 18, which protect the time-gain control (TGC) amplifiers 28 from the high voltages which may exist at the transducer array. By appropriately adjusting the transmit focus time delays and the apodization weightings in a conventional manner, an ultrasonic beam can be directed and focused to form a transmit beam.

The echo signals produced by each burst of ultrasonic energy reflect from objects located at successive ranges along each transmit beam. The echo signals are sensed separately by each transducer element 12 and a sample of the magnitude of the echo signal at a particular point in time represents the amount of reflection occurring at a specific range. Due to differences in the propagation paths between a reflecting point and each transducer element 12, the echo signals are not detected simultaneously and their amplitudes are not equal. Receiver 16 amplifies the separate echo signals via a respective TGC amplifier 28 in each receive channel. TGC is carried out by increasing or decreasing gain as a function of depth. The amount of amplification provided by the TGC amplifiers is controlled through a control line (not shown) that is driven by a TGC circuit (not shown), the latter being set by the host computer and hand operation of potentiometers. The analog echo signals are then sent to receive beamformer 30.

Under the direction of master controller 20, receive beamformer 30 tracks the direction of the transmitted beam, sampling the echo signals at a succession of ranges along each beam. Receive beamformer 30 imparts the proper time delays and receive apodization weightings to each amplified echo signal and sums them to provide an echo signal which accurately indicates the total ultrasonic energy reflected from a point located at a particular range along one ultrasonic beam. The receive focus time delays are computed in real-time using specialized hardware or are read from a lookup table. The receive channels also have circuitry for filtering the received pulses. The time-delayed receive signals are then summed.

In the system shown in FIG. 1, the frequency of the beamformer output signal is shifted to baseband by a demodulator 31. One way of achieving this is to multiply the input signal by a complex sinusoidal $e^{i2\pi f_d t}$, where $f_d$ is the frequency shift required to bring the signal spectrum to baseband. The demodulated signals are then supplied to a signal processor 32 which converts the demodulated signals to display data. In the B-mode (gray-scale), this would be the envelope of the signal with some additional processing, such as edge enhancement and logarithmic compression.

In another conventional system, the RF signals are summed, equalized and envelope-detected without intervening demodulation to baseband. To depict such a system, it is only necessary to remove demodulator 31 from FIG. 1 and couple the output of receive beamformer 30 to the input of signal processor 32. It should be appreciated that the present invention can be employed in both RF and baseband systems.

In general, the display data are converted by scan converter 34 into X-Y format for video display. The scan-converted frames are passed to a video processor (not shown) incorporated in display subsystem 22. The video processor maps the video data for display and sends the mapped image frames to the display subsystem.

The images displayed by the video monitor (not shown) of display subsystem 22 are produced from an image frame of data in which each datum indicates the intensity or brightness of a respective pixel in the display. An image frame may, e.g., comprise a data array in which each intensity datum is an 8-bit binary number that indicates pixel brightness. The brightness of each pixel on the display monitor is continuously refreshed by reading the value of its corresponding element in the data array in a well-known manner. Each pixel has an intensity value which is a function of the backscatter cross section of a respective sample volume in response to interrogating ultrasonic pulses.

Figure 2:
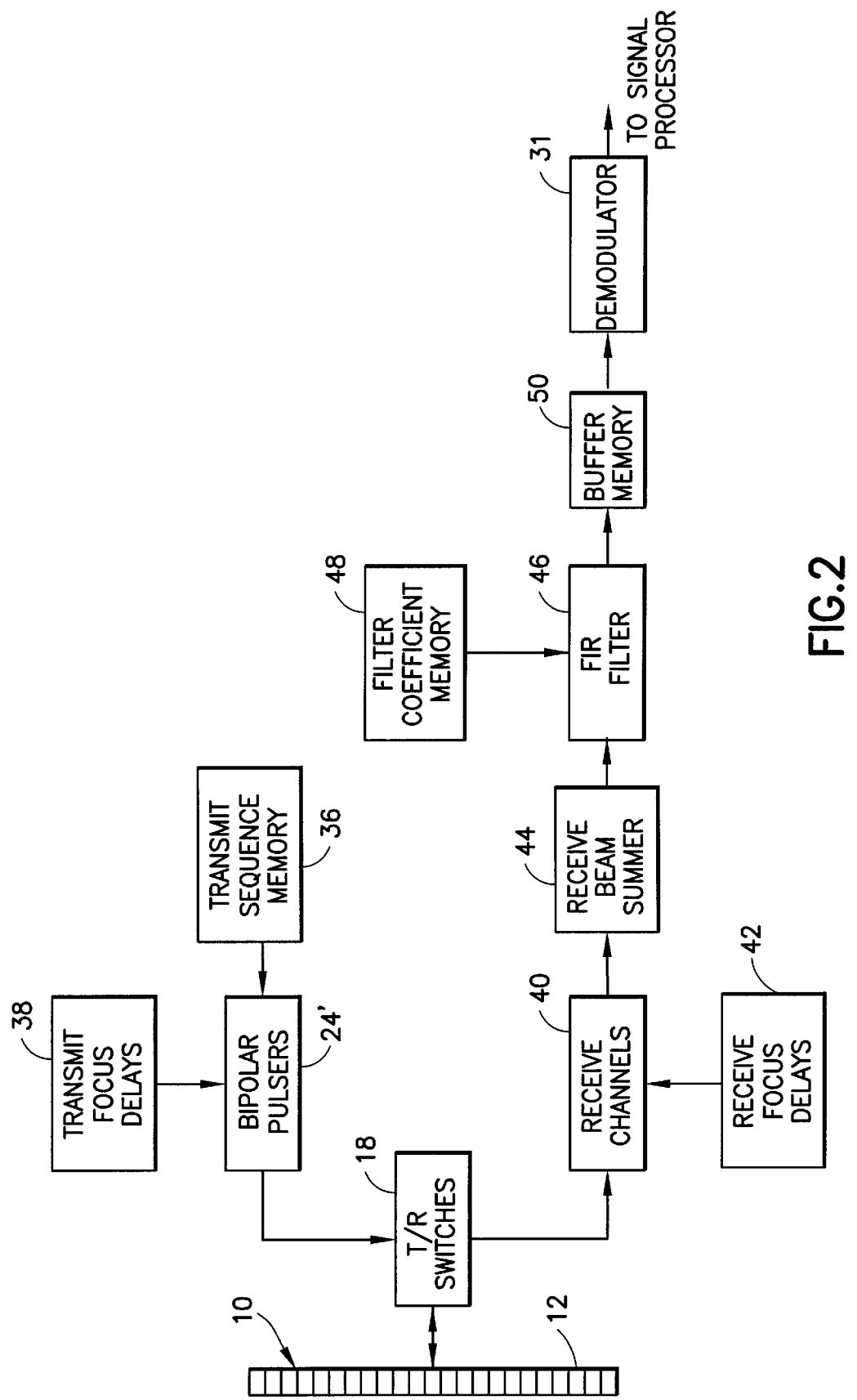
FIG. 2 is a block diagram of an ultrasound imaging system using Golay-coded excitation of transducer elements and decoding of the receive waveform in accordance with a preferred embodiment of the invention.
Figure 3:
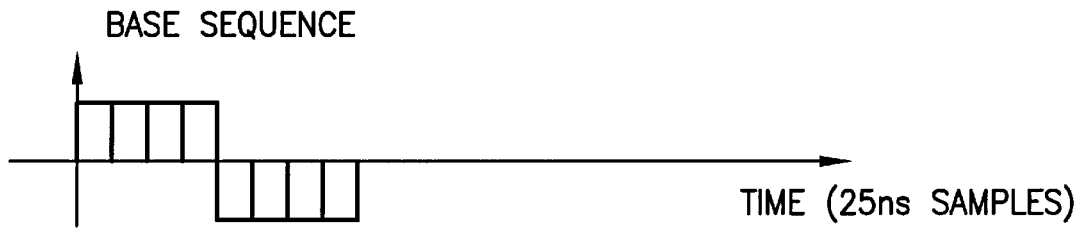
FIGS. 3, 4, 5, 6 and 7 are pulse diagrams showing the base sequence (FIG. 3), the oversampled Golay sequences (FIGS. 4 and 6), and the Golay-encoded transmit sequences (FIGS. 5 and 7) in accordance with a preferred embodiment of the invention.

FIG. 2 shows a preferred embodiment of the invention employing three-transmit Golay-coded excitation for the display of an image. In this system each transducer element in the transmit aperture is pulsed using an encoded transmit sequence. Each encoded transmit sequence is formed by convolving a base sequence (comprising a sequence of +1 and −1 elements) with an oversampled code sequence (comprising a Golay code, each digit being either of two code symbols, +1 and −1). In particular, the base sequence is phase encoded, using a Golay code sequence, to create a Golay-coded transmit sequence. In a preferred embodiment, two different Golay-coded transmit sequences are stored in a transmit sequence memory 36. One of the stored encoded transmit sequences is applied to the pulsers for the first and third transmit firings, while the other stored encoded transmit sequence is applied to the pulsers for the second transmit firing.

During each firing, bipolar pulsers 24' are excited by a Golay-coded transmit sequence provided from transmit sequence memory 36 or from specialized hardware (not shown). In response to the Golay-coded transmit sequence from transmit memory 36 and the transmit focus delays supplied from a look-up table 38, bipolar pulsers 24' supply Golay-coded pulse sequences to the respective transducer elements 12 making up the transmit aperture. The +1 and −1 elements of each Golay-coded transmit sequence are transformed into pulses of opposite phase by the bipolar pulsers. In accordance with a preferred embodiment, three Golay-coded transmit sequences are transmitted consecutively along a scan line, each beam being focused at the same focal position. The same Golay-encoded transmit sequence is transmitted during the first and third firings, which transmit sequence is derived from one of the Golay codes of a Golay code pair. The second Golay-encoded transmit sequence is derived from the other Golay code of the Golay code pair.

During reception, the echo signals resulting from each firing (i.e., each focused transmit beam) are transduced into electrical signals by the transducer elements making up the receive aperture. These receive signals are amplified and time-delayed in receive channels 40 in accordance with the receive focus time delays computed in real-time by specialized hardware 42 or are supplied from a look-up table. The amplified and delayed signals are then summed by a receive beam summer 44 to form respective receive vectors for each firing.

Each receive vector is then "slow-time" filtered by an FIR (finite impulse response) filter 46 and a buffer memory 50 which serves as a vector summer. For each firing, receive correlation is performed using the oversampled Golay sequence corresponding to the Golay-encoded transmit sequence employed in the corresponding transmit firing. Sets of filter coefficients based on the oversampled Golay sequences are stored in filter coefficient memory 48 and are provided to FIR filter 46 at appropriate times.

In accordance with a preferred embodiment of the invention, buffer memory 50 has an input coupled to the output of FIR filter 46. When three transmit firings are used, three sets of weighted filter coefficients are supplied to FIR filter 46 at appropriate times to accomplish receive correlation of the respective receive vectors produced following the three transmit firings. For the first firing, a first set of filter coefficients are read out of memory 48 and provided to FIR filter 46. The first set of coefficients are based on the first oversampled Golay sequence (e.g., A in FIG. 4) multiplied by a first scalar weighting factor (e.g., 0.5), and are also optimized to establish a desired passband, e.g., a band of frequencies centered at the transmit or fundamental frequency. The filtered receive vector acquired from the first transmit firing is then stored in buffer memory 50. For the second firing, a second set of filter coefficients are read out of memory 48 and supplied to FIR filter 46. The second set of coefficients are based on the second oversampled Golay sequence (e.g., B in FIG. 6) multiplied by a second scalar weighting factor (e.g., 1.0), and are also optimized to establish the desired passband. The filtered receive vector acquired from the second transmit firing is then stored in buffer memory 50. For the third firing, the first set of filter coefficients are again read out of memory 48 and supplied to FIR filter 46. The filtered receive vector acquired from the third transmit firing is then stored in buffer memory 50. The three filtered receive vectors are summed in buffer memory 50 to form a Golay-decoded, "slow-time" filtered receive vector, which is processed into an image line of pixel data for display on the display monitor in conventional fashion.

Figure 4:
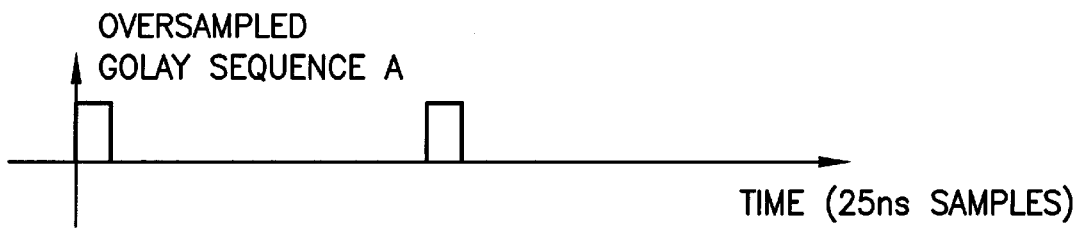
Figure 5:
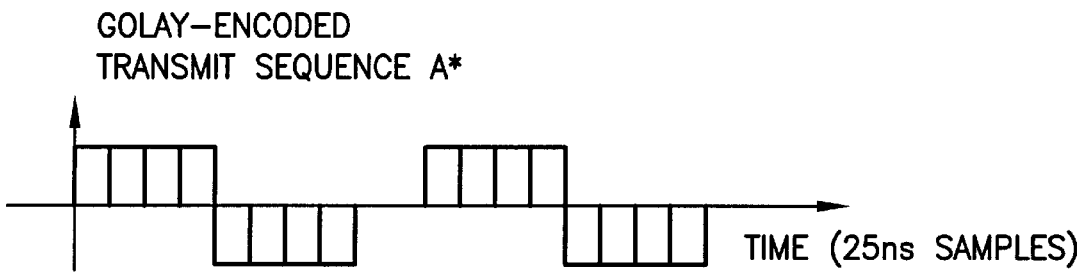
Figure 6:
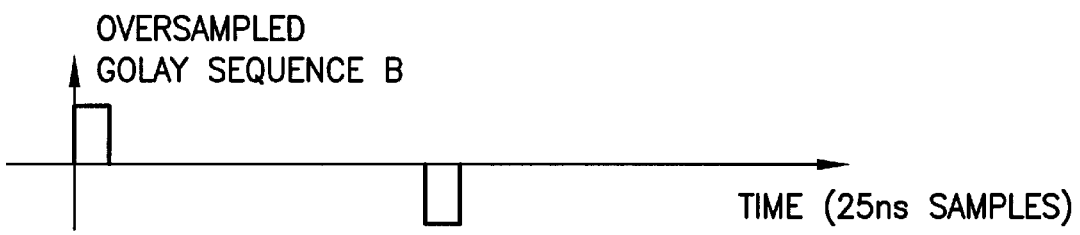
Figure 7:
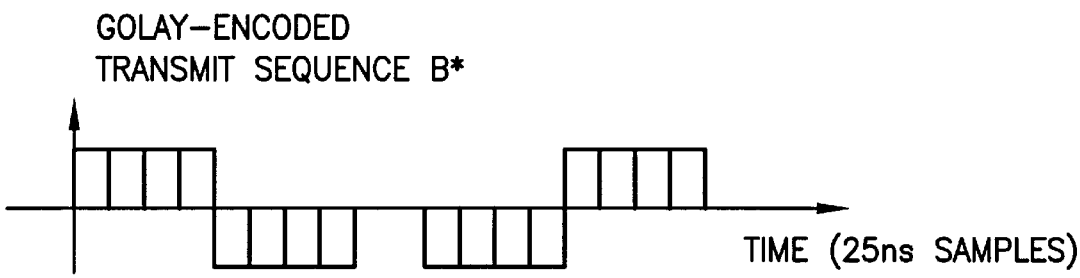

FIGS. 3–7 illustrate the formation of the Golay-encoded transmit sequences A* and B* (shown in FIGS. 5 and 7) from the convolution of the base sequence (shown in FIG. 3) with the respective oversampled Golay sequences A and B (shown in FIGS. 4 and 6). The base sequence is preferably designed to optimize the resulting ultrasonic pulse shape and spectral energy. In the example depicted in FIG. 3, the base sequence is a sequence of pulses having the following polarities: [+1,+1,+1,+1,−1,−1,−1, −1]. To form the first transmit sequence, the base sequence is convolved with oversampled Golay sequence A (see FIG. 4) corresponding to the Golay code [+1,+1]. The resulting Golay-encoded transmit sequence A* is shown in FIG. 5. To form the second transmit sequence, the base sequence is convolved with oversampled Golay sequence B (see FIG. 6) corresponding to the Golay code [+1,−1]. The resulting Golay-encoded transmit sequence B* is shown in FIG. 7. The Golay-encoded transmit sequences are precomputed and stored in the transmit sequence memory 36 (FIG. 2), which, together with look-up Table 38, acts as a transmit beamformer. The resulting pulse sequences are used to excite the transducer elements to transmit a sequence of ultrasonic pulses with polarity given by the Golay-encoded transmit sequence for each firing. The base sequence can be optimized to ensure that the most energy passes through the transducer passband.

As indicated in FIG. 2, each encoded transmit sequence read out of transmit sequence memory 36 controls activation of a multiplicity of bipolar pulsers 24' during a respective transmit firing. Pulsers 24' drive the transducer elements 12 making up the transmit aperture such that the ultrasonic energy produced is focused in a beam for each transmit firing. To accomplish this, transmit focus time delays stored in lookup table 38 are imparted to the respective pulsed waveforms produced by the bipolar pulsers. By appropriately adjusting the transmit focus time delays in a conventional manner, the ultrasonic beams can be focused at a multiplicity of transmit focal positions to effect a scan in an image plane. During each firing, bipolar pulsers 24' can be excited by an encoded transmit sequence supplied from transmit sequence memory 36 or from specialized hardware.

Following each transmit firing, the echo signals from transducer elements 12 are fed to respective receive channels 40 of the receive beamformer. Each receive channel has a TGC amplifier and an analog-to-digital converter (not shown in FIG. 2). Under the direction of master controller 20 (FIG. 1), the receive beamformer tracks the direction of the transmitted beam. Either specialized hardware, or a look-up table constituting a receive beamformer memory 42, imparts the proper receive focus time delays to the received echo signal. Receive beam summer 44 sums the time-delayed receive signals to provide an echo signal which accurately indicates the total ultrasonic energy reflected along a line through a particular transmit focal position.

In accordance with a preferred embodiment of the invention, the summed receive signals from first through third successive firings are provided to FIR filter 46 which substantially performs match filtering. The FIR filter match-filters by convolving the first summed receive signal with a first receive code for the first transmit firing, the second summed receive signal with a second receive code for the second transmit firing, and so forth. The receive codes are a function of the Golay codes and the scalar weightings, as previously described. The match-filtered signals derived from the first through third transmit firings focused at the same transmit focal position are summed in buffer memory 50 acting as a vector summer. The FIR matched filter 46 and vector summer 50 together perform pulse compression of the fundamental signal.

A Golay pair of sequences {A, B} satisfies the complementarity property A*A+B*B=δ(n), where "*" denotes correlation and δ(n) is the Kronecker delta function. In particular, the mainlobes (zero lag) of A*A and B*B are equal, while the rangelobes are opposite in sign such that they cancel when summed together. Without tissue motion between the two transmits {A, B}, the complementarity property results in perfect compression on receive. However, with tissue motion between firings A and B, the result of the summation will no longer be ideal.

The degradation in mainlobe and rangelobes after the summation may be evaluated theoretically by considering the effective wall ("slow-time") filter of the mainlobe, which is [1, 1] and that of the rangelobes, which is [1,−1]. The wall filter responses are plotted in FIG. 8 with the label "2 Tx", wherein the solid curve shows the mainlobe response versus Doppler frequency while the dashed curve shows the rangelobe (or sidelobe) response. When there is no motion between the two transmits (zero Doppler frequency), the rangelobe response is at minus infinity db; however, with increasing motion, image quality degrades as the mainlobe response decreases and the rangelobe response increases.

Figure 8:
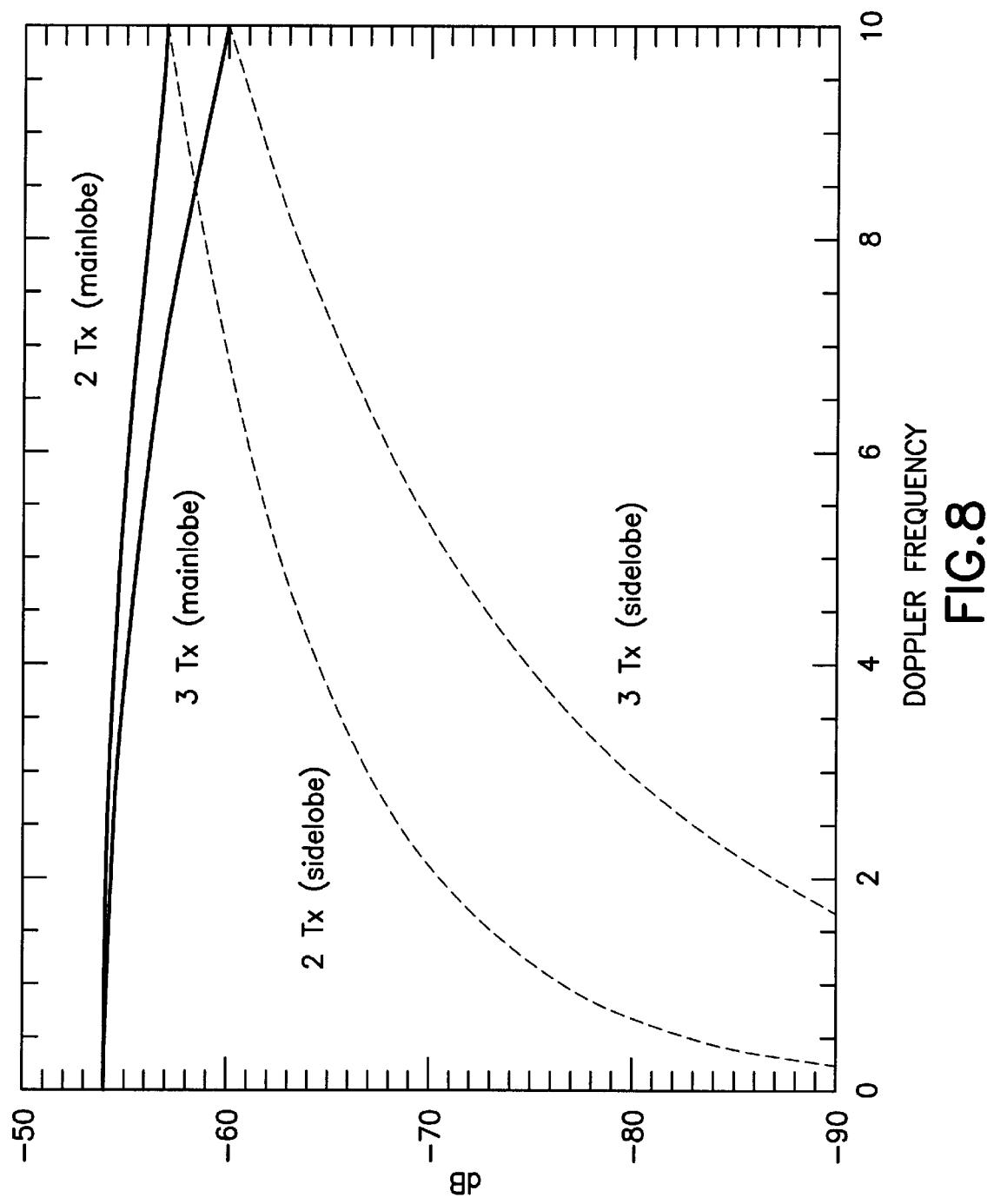
FIG. 8 is a graph showing the mainlobe (solid lines) and sidelobe (dashed lines) responses for two-transmit Golay-coded excitation in accordance with the prior art and for three-transmit Golay-coded excitation in accordance with a preferred embodiment of the invention.

In accordance with preferred embodiments of the invention, more than two firings are transmitted for each transmit focal position in order to suppress the rangelobe response while not altering the mainlobe response substantially in the presence of motion. Since frame rate is inversely proportional to the number of firings per focal zone, it is desirable to have as few firings as possible per focal zone, so the preferred embodiment has three firings: {A*, B*, A*}. The echoes from the three firings are summed together after receive correlation, with the first and third echoes being weighted less than the second echo. The plots labeled "3 Tx" in FIG. 8 show the frequency response using a [0.5, 1.0, 0.5] weighting on receive for summing the three echoes. The resulting effective wall filter for the mainlobe is [0.5, 1.0, 0.5], while that for the rangelobes is [−0.5, 1.0, −0.5]. As can be seen in FIG. 8, the rangelobe response is suppressed by 5–20 dB below that for two-transmit ("2 Tx" in FIG. 8) Golay-coded excitation, while the mainlobe is reduced by less than 3 dB. Although substantial rangelobes still result at the higher tissue speeds, these are expected to be tolerable due the inherent visual blurring from very fast motion.

The summed receive signals for successive transmit firings are supplied to FIR filter 46 which performs the functions of decoding, bandpass filtering and wall filtering (in conjunction with the vector summer). This is accomplished by proper selection of the filter coefficients by the host computer based on system programming and operator inputs. Filter 46 filters across the N transmit firings and supplies filtered signals to buffer memory 50, where they are vector summed.

In the general instance where the number of transmit firings to each transmit focal position equals N, FIR filter 46 has M filter taps for receipt of a respective set of M filter coefficients for each transmit firing. The filter coefficients for the n-th transmit firing are $a_n c_1, a_n c_2, \ldots, a_n c_M$, where $a_n$ is the scalar weighting for the n-th transmit firing, n=1, 2, ..., N, and $c_1, c_2, \ldots, c_M$ is a set of filter coefficients which are selected so that FIR filter 46 both compresses the receive pulses and passes a major fraction of the desired fundamental frequency band. In particular, the filter coefficients $c_1, c_2, \ldots, c_M$ are obtained by convolving a first set of filter coefficients $b_1, b_2, \ldots, b_P$, which are a function of the frequency band to be passed, with a second set of filter coefficients $d_1, d_2, \ldots, d_Q$, which are a function of the Golay codes used to encode the transmit frequencies, where M=P+Q−1. The scalar weightings $a_1, a_2, \ldots, a_N$ form a "slow-time" filter. The successive FIR filter output signals for the N transmit firings are coherently accumulated in buffer memory 50 acting as a vector summer. This is equivalent to a wall filter with a single output sample. The output signal of the vector summer then undergoes envelope detection, post-processing, scan conversion and display in a known manner.

The filter coefficients $a_n c_1, a_n c_2, \ldots, a_n c_M$ are supplied to FIR filter 46 for each transmit firing by filter coefficient memory 48 of a host computer (such as master controller 20 shown in FIG. 1). For the example of three transmit firings given above, $a_1$=0.5, $a_2$=1.0, and $a_3$=0.5. The filter coefficients are programmable depending upon the diagnostic application. Different sets of filter coefficients can be stored in lookup tables in the memory of the host computer and the desired set of coefficients can be selectable by the system operator.

In the embodiments based on FIG. 2, the decoding filter, bandpass filter and wall filter are combined in an FIR filter dynamically supplied with appropriate filter coefficients, and a vector summer. However, it will be readily appreciated by persons skilled in the art that separate filters could be used.

The filtered and summed receive signal is demodulated by demodulator 31 and supplied to signal processor 32 (FIG. 1). In the B mode, signal processing includes envelope detection, edge enhancement and logarithmic compression. After signal processing and scan conversion, a scan line is displayed on the display monitor. This procedure is repeated so that a respective scan line is displayed for each transmit focal position (when there is one transmit focal position for each beam angle) or for each vector (when there are multiple transmit focal positions for each beam angle).

The imaging system incorporating the structure shown in FIG. 2 can also operate by demodulating the RF echo signals to baseband and downsampling before or after beamsummation. In this situation, the oversampled sequences would also be demodulated to baseband and downsampled.

The matched filter (i.e., FIR filter 46) can be implemented in software or hardware at the beamformer output, as shown in FIG. 2, or at the output of demodulator 31 (not shown). In the latter circumstance, the filter coefficients must be matched to the demodulated signals. For the situation when the demodulator shifts by discrete frequencies $f_d = k/2t_b$, where k is any positive integer and $t_b$ is the duration of the encoded transmit sequence, the sinusoidal becomes real and the same set of filter coefficients are provided to both matched filters for the in-phase I and quadrature Q components, which thus form a real filter. In situations when $f_d \neq k/2t_b$, the I and Q matched filters receive different sets of filter coefficients and thus form a complex filter, with the filter coefficients matched to the respective demodulated signal component.

While only certain preferred features of the invention have been illustrated and described, many modifications and changes will occur to those skilled in the art. For example, although the only specific example of a Golay code pair disclosed above is [+1,+1} and [+1,−1], it should be appreciated that other known Golay codes can be employed in the present invention. It is, therefore, to be understood that the appended claims are intended to cover all such modifications and changes as fall within the true spirit of the invention.

What is claimed is:

1. A system for transmitting a beam of wave energy, comprising:

a transducer array including a multiplicity of transducer elements;

a multiplicity of pulsers coupled to respective transducer elements of said transducer array; and a transmit beamformer (36,38) programmed to activate each of said pulsers with a set of transmit focus delays and with first through third Golay-encoded transmit sequences during first through third transmit firings respectively, said Golay-encoded transmit sequences being formed by convolving a base sequence with a first or a second Golay code of a Golay code pair, and said second transmit firing being transmitted after said first transmit firing and before said third transmit firing.

2. The system as recited in claim 1, wherein said transducer elements comprise piezoelectric transducer elements.

3. The system as recited in claim 1, wherein said base sequence is phase encoded.

4. The system as recited in claim 1, wherein said first Golay code is [+1,+1] and said second Golay code is [+1,−1].

5. The system as recited in claim 1, wherein said first and third Golay-encoded transmit sequences are the same and said second Golay-encoded transmit sequence is different from said first and third Golay-encoded transmit sequence.

6. A method for operating a transducer array to transmit beams of wave energy, comprising the steps of driving each transducer element of said transducer array forming a transmit aperture with first through third Golay-encoded transmit sequences during first through third transmit firings respectively, said Golay-encoded transmit sequences being formed by convolving a base sequence with a first or a second Golay code of a Golay code pair, said second transmit firing being transmitted after said first transmit firing and before said third transmit firing.

7. The method ass recited in claim 6, wherein said base sequence is phase encoded.

8. The method as recited in claim 6, wherein said first Golay code is [+1,+1] and said second Golay code is [+1,−1].

9. The method as recited in claim 6, wherein said first and third Golay-encoded transmit sequences are the same and said second Golay-encoded transmit sequence is different from said first and third Golay-encoded transmit sequence.

10. An imaging system comprising:

a transducer array including a multiplicity of transducer elements for transmitting wave energy in response to electrical activation and for transducing returned wave energy into electrical signals;

a transmitter coupled to said transducer array and programmed to activate selected transducer elements forming a transmit aperture to transmit focused wave energy encoded with first through third Golay-encoded transmit sequences during first through third transmit firings respectively, said Golay-encoded transmit sequences being formed by convolving a base sequence with a first or a second Golay code of a Golay code pair, and said second transmit firing being transmitted after said first transmit firing and before said third transmit firing;

a receiver programmed to form first through third receive vectors from electrical signals provided by selected ones of said transducer elements forming a receive aperture subsequent to each of said first through third transmit firings, respectively;

a filter programmed to filter said first through third receive vectors as a function of said first and second Golay codes and as a function of first through third weighting factors, respectively;

a vector summer for summing said first through third filtered receive vectors; and a subsystem for displaying an image having an image portion which is a function of the summed filtered receive vectors.

11. The system as recited in claim 10, wherein said filter is programmed with first through third sets of filter coefficients for filtering said first through third receive vectors respectively, said first set of filter coefficients being a function of said first Golay code and said first weighting factor, said second set of filter coefficients being a function of said second Golay code and said second weighting factor and said third set of filter coefficients being a function of said first Golay code and said third weighting factor.

12. The system as recited in claim 11, wherein each of said first and third weighting factors equals 0.5 and said second weighting factor equals 1.0.

13. The system as recited in claim 10, wherein said transducer elements comprise piezoelectric elements for transmitting ultrasound waves in response to electrical activation and transducing returned ultrasound waves into electrical signals.

14. The system as recited in claim 10, wherein said first Golay code is [+1,+1] and said second Golay code is [+1,−1].

15. The system as recited in claim 10, wherein said subsystem comprises:

a processing subsystem programmed to form an image signal from said summed filtered receive vectors; and a display subsystem programmed to display an image having an image portion which is a function of said image signal.

16. An imaging system comprising:

a transducer array including a multiplicity of transducer elements for transmitting wave energy in response to electrical activation and for transducing returned wave energy into electrical signals;

a display monitor for displaying an image having an image portion which is a function of an image signal; and a computer programmed to perform the steps of:

activating a plurality of said transducer elements to transmit focused wave energy encoded with first through third Golay-encoded transmit sequences during first through third transmit firings, respectively, said Golay-encoded transmit sequences being formed by convolving a base sequence with a first or a second Golay code of a Golay code pair, said second transmit firing being transmitted after said first transmit firing and before said third transmit firing;

forming first through third receive vectors from electrical signals provided by selected ones of said transducer elements forming a receive aperture subsequent to each of said first through third transmit firings, respectively;

filtering said first through third receive vectors as a function of said first and second Golay codes and as a function of first through third weighting factors, respectively;

summing the first through third filtered receive vectors;

forming an image signal from the summed filtered receive vectors; and sending said image signal to said display monitor.

17. The system as recited in claim 16, wherein said base sequence is phase encoded.

18. The system as recited in claim 16, wherein said transducer elements comprise piezoelectric elements for transmitting ultrasound waves in response to electrical activation and transducing returned ultrasound waves into electrical signals.

19. The system as recited in claim 16, wherein said first Golay code is [+1,+1] and said second Golay code is [+1,−1].

20. A method of operating an imaging system comprising a multiplicity of transducer elements for transmitting wave energy in response to electrical activation and for transducing returned wave energy into electrical signals, and a display monitor for displaying an image having an image portion which is a function of an image signal, said method comprising the steps of:

activating a plurality of said transducer elements to transmit focused wave energy encoded with first through third Golay-encoded transmit sequences during first through third transmit firings, respectively, said Golay-encoded transmit sequences being formed by convolving a base sequence with a first or a second Golay code of a Golay code pair, said second transmit firing being transmitted after said first transmit firing and before said third transmit firing;

forming first through third receive vectors from electrical signals provided by selected ones of said transducer elements forming a receive aperture subsequent to each of said first through third transmit firings, respectively;

filtering said first through third receive vectors as a function of said first and second Golay codes and as a function of first through third weighting factors, respectively;

summing the first through third filtered receive vectors;

forming an image signal from the summed filtered receive vectors; and sending said image signal to said display monitor.

21. The method as recited in claim 20, wherein said first Golay code is [+1,+1] and said second Golay code is [+1,−1].

22. An imaging system comprising:

a transducer array including a multiplicity of transducer elements for transmitting wave energy centered at a fundamental frequency in response to electrical activation and for transducing returned wave energy into electrical signals;

a transmitter coupled to said transducer array and programmed to activate a plurality of said transducer elements to transmit focused wave energy encoded with a first Golay code of a Golay code pair during first and third transmit events and to transmit focused wave energy encoded with a second Golay code of said Golay code pair during a second transmit event occurring after said first transmit event and prior to said third transmit event;

a receiver programmed to respectively form first through third receive signals from electrical signals provided by said plurality of transducer elements subsequent to said first through third transmit events, respectively;

a wall filter programmed with first through third sets of filter coefficients to decode, bandpass and wall filter first through third fundamental signal components of said first through third receive signals, respectively, said wall filter being adapted to form an image signal derived at least in part from the decoded, bandpassed and wall-filtered first through third fundamental signal components; and a subsystem for displaying an image having an image portion which is a function of at least said image signal.

23. The system as recited in claim 22, wherein said wall filter is programmed with first through third sets of filter coefficients for filtering said first through third receive vectors, respectively, said first set of filter coefficients being a function of said first Golay code and said first weighting factor, said second set of filter coefficients being a function of said second Golay code and said second weighting factor and said third set of filter coefficients being a function of said first Golay code and said third weighting factor.

24. The system as recited in claim 23, wherein each of said first and third weighting factors equals 0.5 and said second weighting factor equals 1.0.

25. The system as recited in claim 22, wherein said transducer elements comprise piezoelectric elements for transmitting ultrasound waves in response to electrical activation and for transducing returned ultrasound waves into electrical signals.

26. The system as recited in claim 22, wherein said first Golay code is [+1,+1] and said second Golay code is [+1,−1].

27. The system as recited in claim 22, wherein said base sequence is phase encoded.

* * * * *